US010317120B2

(12) United States Patent
Hamada et al.

(10) Patent No.: US 10,317,120 B2
(45) Date of Patent: Jun. 11, 2019

(54) AIR CONDITIONING SYSTEM WITH INDOOR AND VENTILATION CIRCUITS

(71) Applicant: Mitsubishi Electric Corporation, Tokyo (JP)

(72) Inventors: Mamoru Hamada, Tokyo (JP); Masaki Toyoshima, Tokyo (JP); Hayato Horie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 15/307,154

(22) PCT Filed: May 13, 2014

(86) PCT No.: PCT/JP2014/062756

§ 371 (c)(1),
(2) Date: Oct. 27, 2016

(87) PCT Pub. No.: WO2015/173896

PCT Pub. Date: Nov. 19, 2015

(65) Prior Publication Data

US 2017/0045279 A1 Feb. 16, 2017

(51) Int. Cl.
*F25B 25/00* (2006.01)
*F24F 11/30* (2018.01)
(Continued)

(52) U.S. Cl.
CPC ........ *F25B 49/022* (2013.01); *F24F 11/0086* (2013.01); *F24F 11/30* (2018.01);
(Continued)

(58) Field of Classification Search
CPC ............ F25B 25/005; F25B 2600/0253; F25B 2313/023; F25B 2313/0233;
(Continued)

(56) References Cited

U.S. PATENT DOCUMENTS

| | | |
|---|---|---|
| 4,100,763 A | 7/1978 | Brody |
| 2010/0211224 A1 | 8/2010 | Keeling et al. |

(Continued)

FOREIGN PATENT DOCUMENTS

| | | |
|---|---|---|
| EP | 2 253 897 A1 | 11/2010 |
| JP | 07-285326 A | 10/1995 |

(Continued)

OTHER PUBLICATIONS

Office Action dated Jun. 27, 2017 for the corresponding JP application No. 2016519024 (English translation).

(Continued)

*Primary Examiner* — Edward F Landrum
*Assistant Examiner* — Daniel C Comings
(74) *Attorney, Agent, or Firm* — Posz Law Group, PLC

(57) ABSTRACT

An air conditioning system according to the present invention changes a target supply temperature based on a magnitude relationship between an operating frequency of a first compressor and a first frequency at which an operating efficiency of the first compressor reaches a maximum, and a magnitude relationship between an operating frequency of a second compressor and a second frequency at which an operating efficiency of the second compressor reaches a maximum.

23 Claims, 12 Drawing Sheets

21 25 26 23 22 3 4 27 24 11 15 18 13 2 1 12 16 14 17

REFRIGERANT FLOW

(51) Int. Cl.

| | |
|---|---|
| ***F24F 11/00*** | (2018.01) |
| ***F25B 49/02*** | (2006.01) |
| *F25B 13/00* | (2006.01) |

(52) U.S. Cl.

CPC ............ *F25B 13/00* (2013.01); *F25B 25/005* (2013.01); *F25B 2313/0233* (2013.01); *F25B 2313/0253* (2013.01); *F25B 2313/02741* (2013.01); *F25B 2313/0314* (2013.01); *F25B 2400/06* (2013.01); *F25B 2500/19* (2013.01); *F25B 2600/0253* (2013.01); *F25B 2700/2104* (2013.01); *Y02B 30/741* (2013.01)

(58) Field of Classification Search

CPC .. F25B 2313/02331; F25B 2313/02334; F25B 2313/025; F25B 2313/0253; F25B 2313/02531; F25B 2313/02533; F24F 11/30; F24F 11/0001; F24F 2011/0002

See application file for complete search history.

(56) References Cited

U.S. PATENT DOCUMENTS

| | | | | |
|---|---|---|---|---|
| 2012/0111035 | A1* | 5/2012 | Campbell | F25B 25/005 62/113 |
| 2013/0151019 | A1 | 6/2013 | Federspiel | |

FOREIGN PATENT DOCUMENTS

| | | | |
|---|---|---|---|
| JP | 08-178400 | A | 7/1996 |
| JP | 2002-022245 | A | 1/2002 |
| JP | 2002-054834 | A | 2/2002 |
| JP | 2003-139436 | A | 5/2003 |
| JP | 2003-214686 | A | 7/2003 |
| JP | 2005-225438 | A | 8/2005 |
| JP | 2008-57938 | A | 3/2008 |
| JP | 2010-121912 | A | 6/2010 |
| JP | 2010-249485 | A | 11/2010 |
| JP | 2010-266199 | A | 11/2010 |
| JP | 2012-007884 | A | 1/2012 |
| JP | 2012-077968 | A | 4/2012 |
| WO | 2013/049268 | A1 | 4/2013 |

OTHER PUBLICATIONS

International Search Report of the International Searching Authority dated Jul. 22, 2014 for the corresponding international application No. PCT/JP2014/062756 (and English translation).

* cited by examiner

INCREASE TARGET SUPPLY TEMPERATURE

INCREASE TARGET
SUPPLY TEMPERATURE

DECREASE TARGET SUPPLY TEMPERATURE

INCREASE TARGET SUPPLY TEMPERATURE

AIR CONDITIONING SYSTEM WITH INDOOR AND VENTILATION CIRCUITS

CROSS REFERENCE TO RELATED APPLICATION

This application is a U.S. national stage application of PCT/JP2014/062756 filed on May 13, 2014, the contents of which are incorporated herein by reference.

TECHNICAL FIELD

The present invention relates to an air conditioning system equipped with a ventilating device.

BACKGROUND ART

In the related art, air conditioning systems equipped with an air conditioning apparatus that includes a refrigerant circuit (refrigeration cycle), and a ventilating device have been conventional.

In the refrigerant circuit of an air conditioning apparatus, a compressor, a four-way valve, an outdoor heat exchanger, an expansion valve, and an indoor heat exchanger are connected in series by pipes to allow the circulation of refrigerant.

During cooling operation, high-temperature and high-pressure gas refrigerant compressed by the compressor is sent into the outdoor heat exchanger, exchanges heat with indoor air inside the outdoor heat exchanger, and liquefies. The liquefied refrigerant is depressurized by a pressure-reducing device into a two-phase gas-liquid state, and flows into the indoor heat exchanger. The refrigerant flowing into the indoor heat exchanger exchanges heat with indoor air to absorb the heat from the indoor air, and gasifies. Meanwhile, the indoor air loses heat, and thus the indoor space is cooled. The gasified refrigerant returns to the compressor.

In addition, the ventilating device performs an operation of replacing the air indoors with fresh air from outdoors. Specifically, air from outdoors is supplied indoors, while air from indoors is exhausted outdoors.

For this reason, in an air conditioning system equipped with this type of ventilating device, during cooling, when the outdoor air introduced from outdoors has a high enthalpy, the outdoor air becomes a cooling load (outdoor air load). Thus, the temperature of the outdoor air is adjusted by the ventilating device before the outdoor air is supplied indoors.

With the technology described in Patent Literature 1, in an air conditioning system equipped with an air conditioning apparatus and an outdoor air processing device (ventilating device), a first target air conditioning capacity to be exhibited by the air conditioning apparatus and a second target air conditioning capacity to be exhibited by the outdoor air processing device are determined so that the power consumption of the air conditioning apparatus and the outdoor air processing device is minimized under a condition in which the sum of the first target air conditioning capacity and the second target air conditioning capacity are equal to the air conditioning capacity required for the air conditioning system as a whole.

CITATION LIST

Patent Literature

Patent Literature 1: Japanese Unexamined Patent Application Publication No. 2010-121912 (Abstract)

SUMMARY OF INVENTION

Technical Problem

However, with the technology described in Patent Literature 1, to determine the air conditioning capacity to serve as the target, the air conditioning load has to be continually estimated. For this reason, the power savings may be reduced due to lowered estimation accuracy. In addition, continually estimating the air conditioning load imposes a large computational processing load on the computational device, and thus tracking the change over time in the outdoor temperature, the outdoor humidity, and the internal load is difficult.

The present invention has been devised to solve the above problems, and an objective of the present invention is to obtain an air conditioning system having increased power savings in an air conditioning system equipped with a ventilating device.

Solution to Problem

An air conditioning system according to an embodiment of the present invention includes a first refrigerant circuit in which a first compressor, a first outdoor heat exchanger, a first expansion valve, and an indoor heat exchanger are connected by pipes, and through which refrigerant circulates, an indoor unit that causes indoor air in an indoor space to pass through the indoor heat exchanger, and then provides the indoor air to the indoor space, a first frequency control unit that controls an operating frequency of the first compressor so that a temperature of the indoor air becomes a target indoor temperature, a second refrigerant circuit in which a second compressor, a second outdoor heat exchanger, a second expansion valve, and a heat exchanger for ventilation are connected by pipes, and through which refrigerant circulates, a ventilating device that introduces outdoor air from an outdoor space, causes the outdoor air to pass through the heat exchanger for ventilation, and then provides supply air to the indoor space, a second frequency control unit that controls an operating frequency of the second compressor so that a temperature of the supply air becomes a target supply temperature, and a set value control unit that changes a set value of the target supply temperature based on the operating frequency of the first compressor and the operating frequency of the second compressor.

Advantageous Effects of Invention

According to the embodiment of the present invention, the power savings can be improved in the air conditioning system equipped with the ventilating device.

DESCRIPTION OF EMBODIMENTS

Embodiment 1

Figure 1:
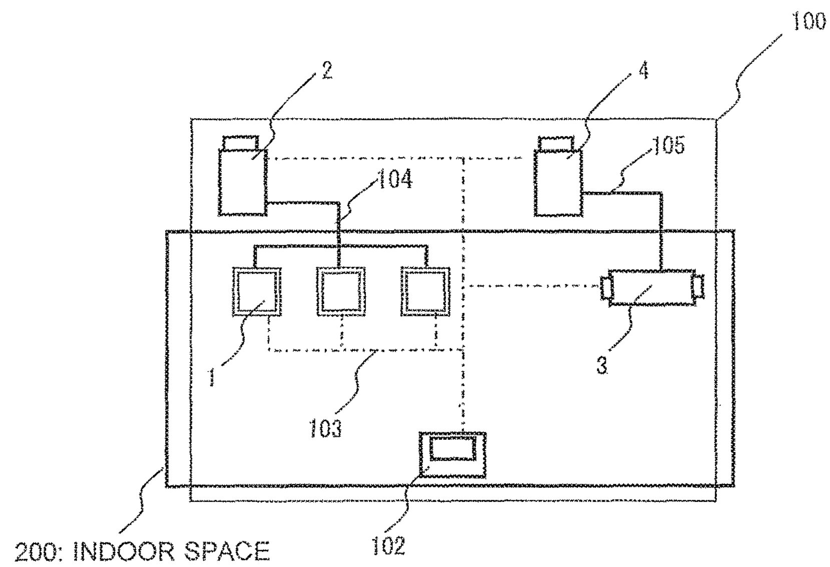
FIG. 1 is a schematic diagram illustrating a configuration of an air conditioning system according to Embodiment 1 of the present invention.

FIG. 1 is a schematic diagram illustrating a configuration of an air conditioning system according to Embodiment 1 of the present invention.

As illustrated in FIG. 1, the air conditioning system 100 is equipped with one or multiple indoor units 1, an outdoor unit 2 on the indoor unit subsystem, one or multiple ventilating devices 3, an outdoor unit 4 on the ventilating device subsystem, and a central controller 102.

The one or multiple indoor units 1 and the outdoor unit 2 on the indoor unit subsystem are connected by refrigerant pipes 104. The indoor unit 1 is disposed in an indoor space 200, while the outdoor unit 2 on the indoor unit subsystem is disposed outdoors.

The one or multiple ventilating devices 3 and the outdoor unit 4 on the ventilating device subsystem are connected by refrigerant pipes 105. The ventilating device 3 is disposed in the indoor space 200, while the outdoor unit 4 on the ventilating device subsystem is disposed outdoors.

The central controller 102 is connected to each of the indoor unit 1, the outdoor unit 2 on the indoor unit subsystem, the ventilating device 3, and the outdoor unit 4 on the ventilating device subsystem by transmission lines 103.

Figure 2:
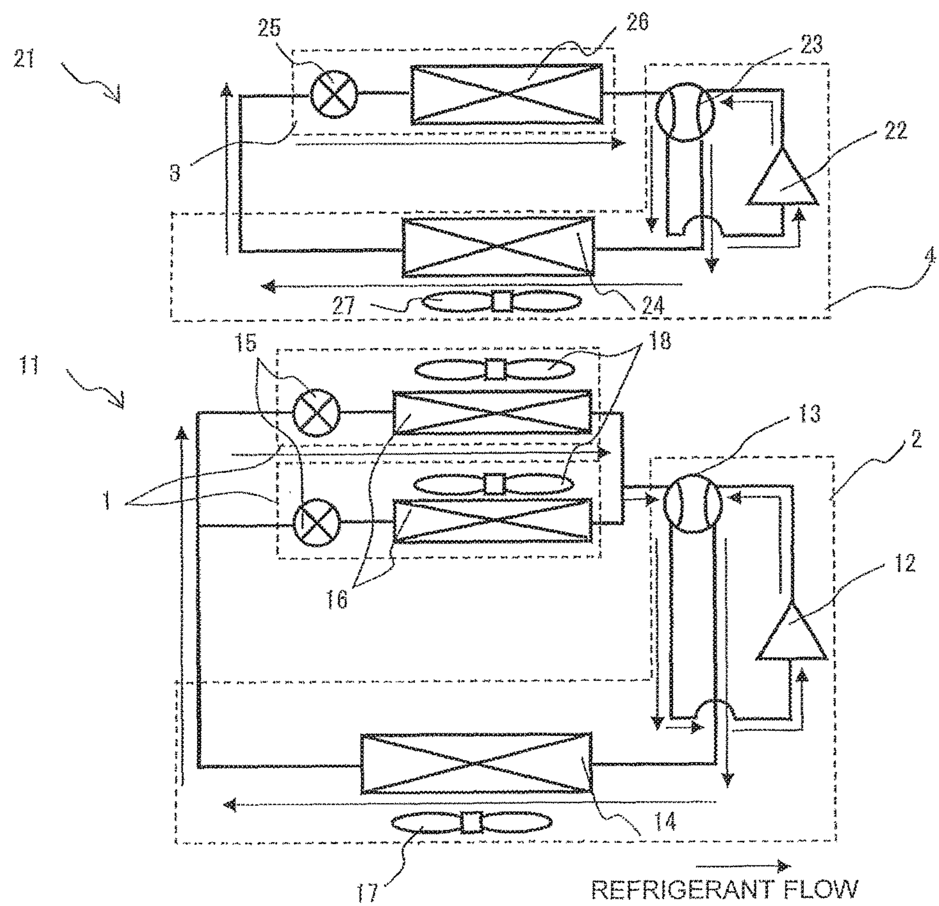
FIG. 2 is a schematic diagram of a refrigerant subsystem of the air conditioning system according to Embodiment 1 of the present invention.

FIG. 2 is a schematic diagram of refrigerant subsystems of the air conditioning system according to Embodiment 1 of the present invention.

As illustrated in FIG. 2, the air conditioning system 100 is equipped with two refrigerant subsystems. One is a first refrigerant subsystem 11 that is the indoor unit subsystem, and the other is a second refrigerant subsystem 21 that is the ventilating device subsystem.

The first refrigerant subsystem 11 is equipped with a compressor 12, a four-way valve 13, an outdoor heat exchanger 14, expansion valves 15, indoor heat exchangers 16, a fan 17 for the outdoor heat exchanger 14, and fans 18 for the indoor heat exchangers 16.

The compressor 12, the four-way valve 13, the outdoor heat exchanger 14, the expansion valves 15, and the indoor heat exchangers 16 are connected in series by pipes, and constitute a refrigerant circuit through which refrigerant circulates.

The compressor 12, the four-way valve 13, the outdoor heat exchanger 14, and the fan 17 are disposed in the outdoor unit 2.

The expansion valves 15, the indoor heat exchangers 16, and the fans 18 are disposed in the indoor unit 1.

The second refrigerant subsystem 21 is equipped with a compressor 22, a four-way valve 23, an outdoor heat exchanger 24, an expansion valve 25, a cooler 26, and a fan 27 for the outdoor heat exchanger 24.

The compressor 22, the four-way valve 23, the outdoor heat exchanger 24, the expansion valve 25, and the cooler 26 are connected in series by pipes, and constitute a refrigerant circuit through which refrigerant circulates.

The compressor 22, the four-way valve 23, the outdoor heat exchanger 24, and the fan 27 are disposed in the outdoor unit 4.

The expansion valve 25 and the cooler 26 are disposed in the ventilating device 3.

Figure 3:
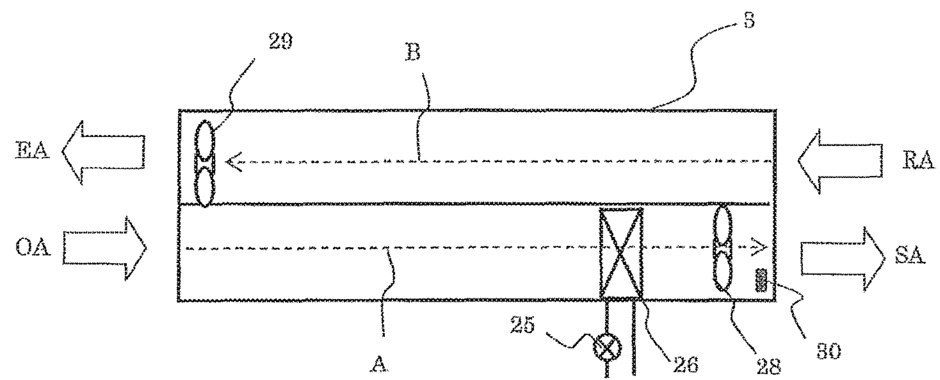
FIG. 3 is a schematic diagram illustrating a configuration of a ventilating device of the air conditioning system according to Embodiment 1 of the present invention.

FIG. 3 is a schematic diagram illustrating a configuration of a ventilating device of the air conditioning system according to Embodiment 1 of the present invention.

As illustrated in FIG. 3, the ventilating device 3 is equipped with the cooler 26, an air supply fan 28, and an exhaust fan 29 inside a main casing. Also, inside the main case, an air supply flow channel A and an exhaust flow channel B are formed independently of each other.

The air supply flow channel A is a flow channel that causes outdoor air OA to be taken in by the air supply fan 28, pass through the cooler 26, and be supplied to the indoor space 200 as supply air SA.

The exhaust flow channel B is a flow channel that causes room return air RA to be taken in by the exhaust fan 29 and exhausted outdoors as exhaust air EA.

The ventilating device 3 is additionally equipped with a supply air temperature detection unit 30 that detects the temperature of the supply air SA.

Note that a ventilating device equipped with a total heat exchanger that performs total heat exchange between the outdoor air OA and the room return air RA may also be configured.

Figure 4:
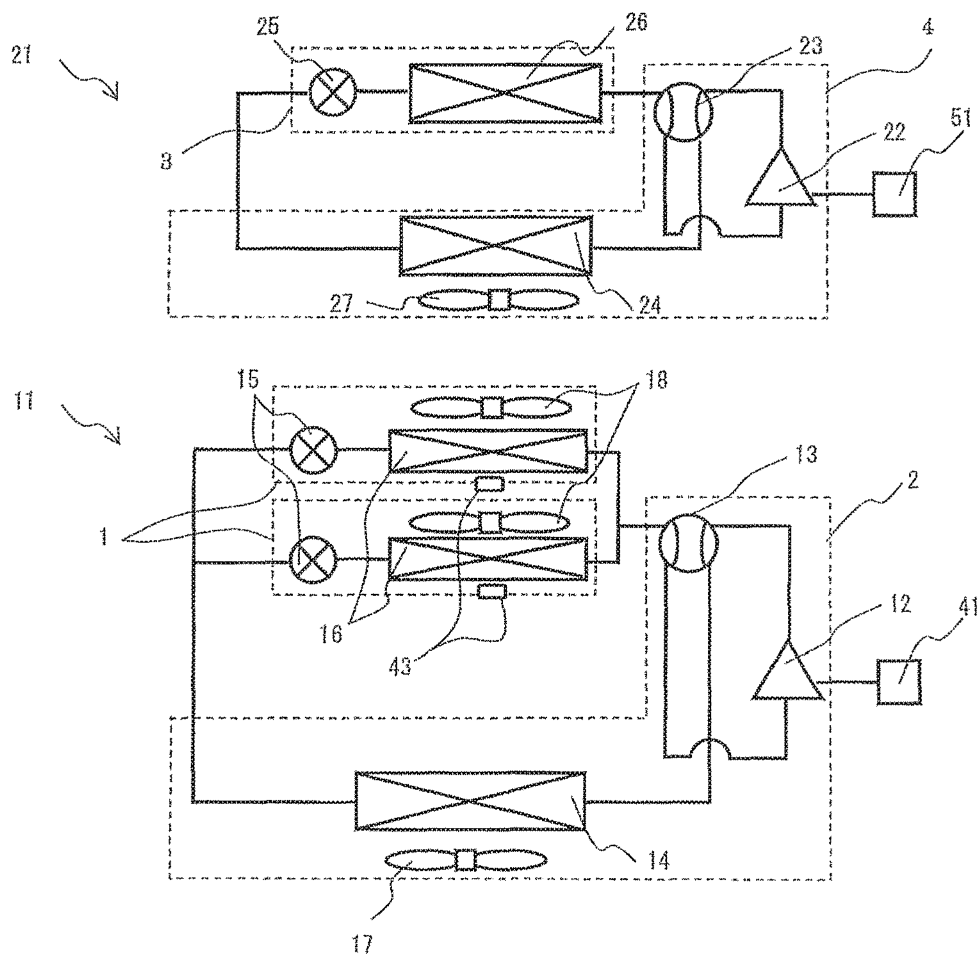
FIG. 4 is a schematic diagram of refrigerant subsystems according to Embodiment 1 of the present invention.

FIG. 4 is a schematic diagram of refrigerant subsystems according to Embodiment 1 of the present invention.

Although omitted from illustration in FIG. 1, the first refrigerant subsystem 11 and the second refrigerant subsystem 21 are provided with various detection devices and control devices as illustrated in FIG. 4.

The first refrigerant subsystem 11 is equipped with a compressor frequency control unit 41 and inlet temperature and humidity detection units 43.

The suction temperature and humidity detection unit 43 is provided in each of the multiple indoor units 1. The suction temperature and humidity detection unit 43 detects the temperature and humidity of the inlet air of the indoor unit 1 (indoor air).

The compressor frequency control unit 41 controls the number of rotations (operating frequency) of the driving motor of the compressor 12, and thereby varies the operating capacity of the compressor 22.

In addition, the compressor frequency control unit 41 acquires information about the target indoor temperature that is a set value for the temperature of the room return air RA from the central controller 102. Subsequently, the compressor frequency control unit 41 controls the operating frequency of the compressor 12 so that the temperature of the room return air RA detected by the inlet temperature and humidity detection unit 43 reaches the target indoor temperature.

Furthermore, the compressor frequency control unit 41 transmits information about the current operating frequency Fi of the compressor 12 to the central controller 102.

The second refrigerant subsystem 21 is equipped with a compressor frequency control unit 51.

The compressor frequency control unit 51 controls the number of rotations (operating frequency) of the driving motor of the compressor 22, and thereby varies the operating capacity of the compressor 22.

In addition, the compressor frequency control unit 51 acquires information about the target supply temperature that is a set value for the temperature of the supply air SA from the central controller 102. Subsequently, the compressor frequency control unit 51 controls the operating frequency of the compressor 22 so that the temperature of the supply air SA detected by the supply air temperature detection unit 30 reaches the target supply temperature.

Furthermore, the compressor frequency control unit 51 transmits information about the current operating frequency Fv of the compressor 22 to the central controller 102.

The central controller 102 changes the set value of the target supply temperature, and transmits information about the target supply temperature to the compressor frequency control unit 51. Details will be discussed later.

Note that the supply air temperature detection unit 30 and the inlet temperature and humidity detection unit 43 are each constituted of a sensor device.

The compressor frequency control unit 41, the compressor frequency control unit 51, and the central controller 102 may be constituted of hardware such as a circuit device having these functions, or may be constituted of as software executed by a computational device such as a microcontroller and a CPU.

Note that the compressor frequency control unit 41 and the compressor frequency control unit 51 may also be provided in the central controller 102. Additionally, the functions of the central controller 102 may also be provided in the compressor frequency control unit 41 or the compressor frequency control unit 51.

Note that the central controller 102 corresponds to a "set value control unit" according to the present invention.

Also, the cooler 26 corresponds to a "ventilation heat exchanger" according to the present invention.

Next, the action of the refrigerant circuits during cooling operation and during heating operation will be described.

First, the action during cooling operation will be described.

In the first refrigerant subsystem 11, high-temperature and high-pressure gas refrigerant discharged from the compressor 12 passes through the four-way valve 13, flows into the outdoor heat exchanger 14, and condenses and liquefies by exchanging heat with outdoor air. The condensed and liquefied refrigerant is depressurized by the expansion valves 15 to become low-pressure two-phase gas-liquid refrigerant, flows into the indoor heat exchangers 16, and gasifies by exchanging heat with air. The gasified refrigerant passes through the four-way valve 13 and is suctioned into the compressor 12.

Consequently, the indoor air sent by the fans 18 for the indoor heat exchangers 16 is cooled and supplied to the indoor space 200, thereby cooling the indoor space 200.

In the second refrigerant subsystem 21, high-temperature and high-pressure gas refrigerant discharged from the compressor 22 passes through the four-way valve 23, flows into the outdoor heat exchanger 24, and condenses and liquefies by exchanging heat with the outdoor air OA passing through the air supply flow channel A. The condensed and liquefied refrigerant is depressurized by the expansion valve 25 to become low-pressure two-phase gas-liquid refrigerant, flows into the cooler 26, and gasifies by exchanging heat with the outdoor air OA. The gasified refrigerant passes through the four-way valve 23 and is suctioned into the compressor 22.

Consequently, the outdoor air OA passing through the air supply flow channel A is cooled by the air supply fan 28, and the cooled air is supplied to the indoor space 200 as the supply air SA.

Next, the action during heating operation will be described.

In the first refrigerant subsystem 11, high-temperature and high-pressure gas refrigerant discharged from the compressor 12 passes through the four-way valve 13, flows into the indoor heat exchangers 16, and condenses and liquefies by exchanging heat with indoor air. The condensed and liquefied refrigerant is depressurized by the expansion valves 15 to become low-pressure two-phase gas-liquid refrigerant, flows into the outdoor heat exchanger 14, and gasifies by exchanging heat with air. The gasified refrigerant passes through the four-way valve 13 and is suctioned into the compressor 12.

Consequently, the indoor air sent by the fans 18 for the indoor heat exchangers 16 is heated and supplied to the indoor space 200, thereby heating the indoor space 200.

In the second refrigerant subsystem 21, high-temperature and high-pressure gas refrigerant discharged from the compressor 22 passes through the four-way valve 23, flows into the cooler 26, and condenses and liquefies by exchanging heat with the outdoor air OA passing through the air supply flow channel A. The condensed and liquefied refrigerant is depressurized by the expansion valve 25 to become low-pressure two-phase gas-liquid refrigerant, flows into the outdoor heat exchanger 24, and gasifies by exchanging heat with air. The gasified refrigerant passes through the four-way valve 23 and is suctioned into the compressor 22.

Consequently, the outdoor air OA passing through the air supply flow channel A is heated by the air supply fan 28, and the heated air is supplied to the indoor space 200 as the supply air SA.

Note that the air conditioning system 100 may perform the operation of at least one of heating operation and cooling operation, and the four-way valves 13 and 23 may be omitted.

(Refrigerant Circuit Capacity Adjustment Action)

Next, a capacity adjustment action during cooling and during heating will be described.

First, the capacity adjustment action during cooling operation will be described.

In the first refrigerant subsystem 11, the compressor frequency control unit 41 controls the frequency of the compressor 12 so that the temperature of the room return air RA detected by the inlet temperature and humidity detection unit 43 matches the target indoor temperature. Specifically, with this control, when the room return air RA is lower than the target indoor temperature, the operating frequency of the compressor 12 is lowered or operation is stopped, whereas when the room return air RA is equal to or greater than the target indoor temperature, the operating frequency of the compressor 12 is increased.

In the second refrigerant subsystem 21, the compressor frequency control unit 51 controls the frequency of the compressor 22 so that the temperature of the supply air SA detected by the supply air temperature detection unit 30 matches the target supply temperature. Specifically, with this control, when the supply air SA is less than the target supply temperature, the operating frequency of the compressor 22 is lowered or operation is stopped, whereas when the supply air SA is equal to or greater than the target supply temperature, the operating frequency of the compressor 12 is increased.

Next, the capacity adjustment action during heating operation will be described.

In the first refrigerant subsystem 11, the compressor frequency control unit 41 controls the frequency of the compressor 12 so that the temperature of the room return air RA detected by the inlet temperature and humidity detection unit 43 matches the target indoor temperature. Specifically, with this control, when the room return air RA is lower than the target indoor temperature, the operating frequency of the compressor 12 is increased, whereas when the room return air RA is equal to or greater than the target indoor temperature, the operating frequency of the compressor 12 is lowered or operation is stopped.

In the second refrigerant subsystem 21, the compressor frequency control unit 51 controls the frequency of the compressor 22 so that the temperature of the supply air SA detected by the supply air temperature detection unit 30 matches the target supply temperature. Specifically, with this control, when the supply air SA is less than the target supply temperature, the operating frequency of the compressor 22 is increased, whereas when the supply air SA is equal to or greater than the target supply temperature, the operating frequency of the compressor 12 is lowered or operation is stopped.

In this way, in the air conditioning system 100, each of the first refrigerant subsystem 11 that serves as the indoor unit subsystem and the second refrigerant subsystem 21 that serves as the ventilating device subsystem performs an action of adjusting the operating capacity.

(Relationship Between Compressor Frequency and Overall Adiabatic Efficiency)

Figure 5:
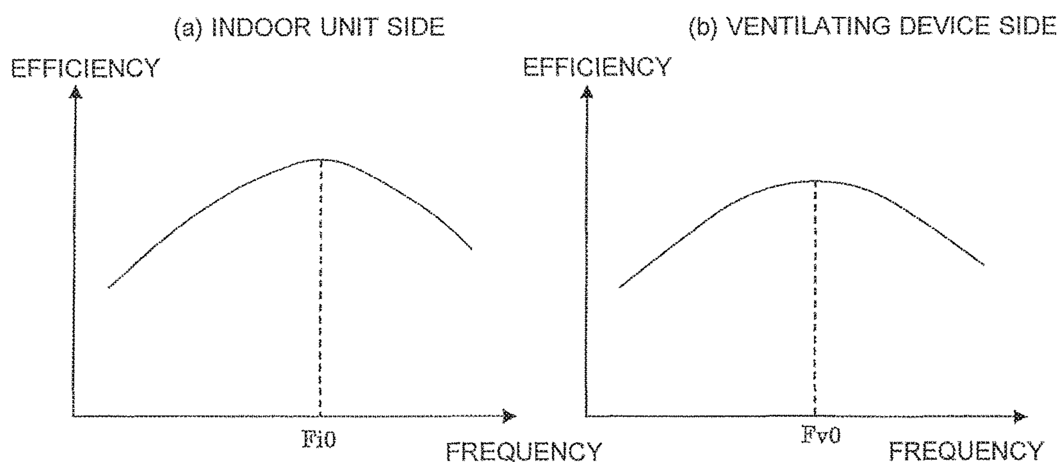
FIG. 5 is a diagram illustrating the relationship between the frequency of a typical compressor and overall adiabatic efficiency.

FIG. 5 is a diagram illustrating the relationship between the frequency of a typical compressor and overall adiabatic efficiency.

Note that in FIG. 5, (a) indicates the relationship of the compressor 12, and hereinafter is referred to the "indoor unit side". Also, (b) indicates the relationship of the compressor 22, and hereinafter is referred to the "ventilating device side". This reference applies similarly to FIGS. 6 to 8 discussed later.

The power when the compressors 12 and 22 are performing adiabatic compression is called the ideal adiabatic compression power, and the actual compressor power is greater than the ideal adiabatic compression power. The ratio between the ideal adiabatic compression power and the actual compressor power is called the overall adiabatic efficiency, and is defined in the following Math. 1. The adiabatic efficiency ηc and the mechanical efficiency ηm are defined in the following Math. 2 and Math. 3, respectively.

[Math. 1]

$$\text{Overall adiabatic efficiency}=\eta c\times\eta m \quad (1)$$

[Math. 2]

$$\text{Adiabatic efficiency } \eta c=\text{Ideal adiabatic compression power}/(\text{Actual compressor power}-\text{Power lost due to mechanical friction}) \quad (2)$$

[Math. 3]

$$\text{Mechanical efficiency } \eta m=(\text{Actual compressor power}-\text{Power lost due to mechanical friction})/\text{Actual compressor power} \quad (3)$$

As in FIG. 5, the overall adiabatic efficiency has a characteristic of changing depending on the frequency of the compressor 12 or 22. Maximum efficiency values are at Fi0 (Hz) and Fv0 (Hz). When the frequency goes above or below the frequency Fi0 or Fv0, the overall adiabatic efficiency (hereinafter, the efficiency) becomes lower, and the electric power consumed by the compressor 12 increases with respect to the amount of heat exchange in the air conditioning system as a whole (hereinafter, the capacity).

To exhibit efficient capacity with low power consumption, the operation is preferred to be performed with frequencies close to the high-efficiency frequencies Fi0 and Fv0. The ratio of the capacity to the power consumption in the compressor 12 or 22 is called the COP, and a higher COP means more efficient operation.

(Overview of Control of Target Supply Temperature)

Figure 6:
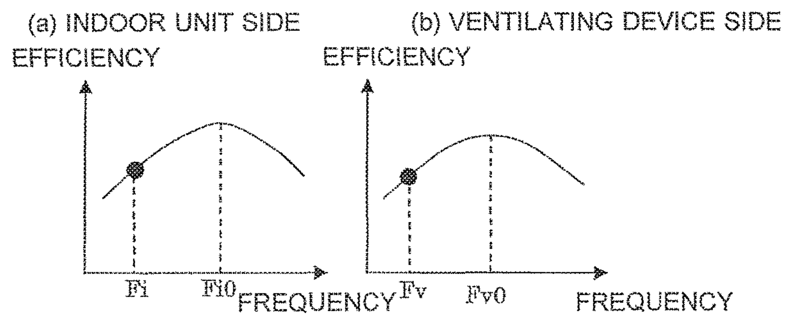
FIG. 6 is a diagram explaining a target supply temperature control action of the air conditioning system according to Embodiment 1 of the present invention.
Figure 6:
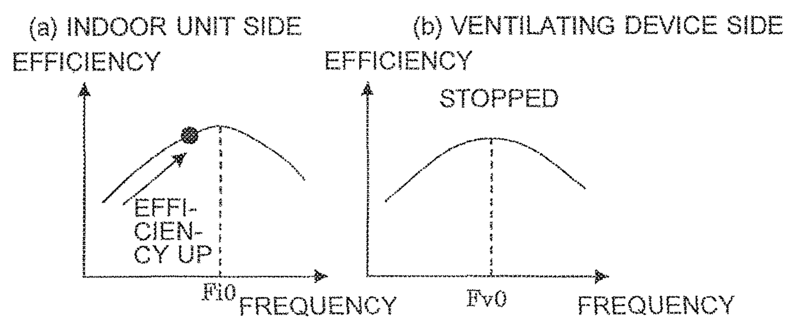
Figure 7:
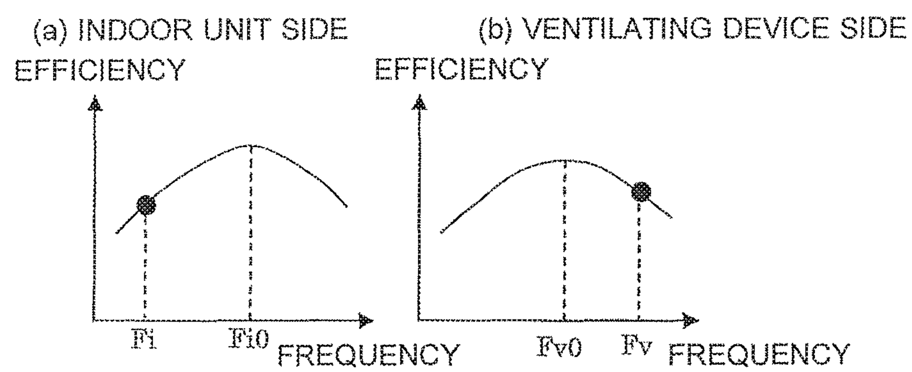
FIG. 7 is a diagram explaining a target supply temperature control action of the air conditioning system according to Embodiment 1 of the present invention.
Figure 7:
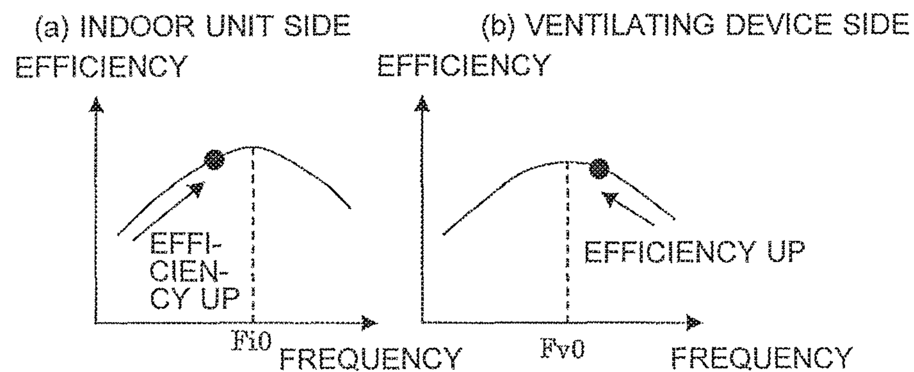
Figure 8:
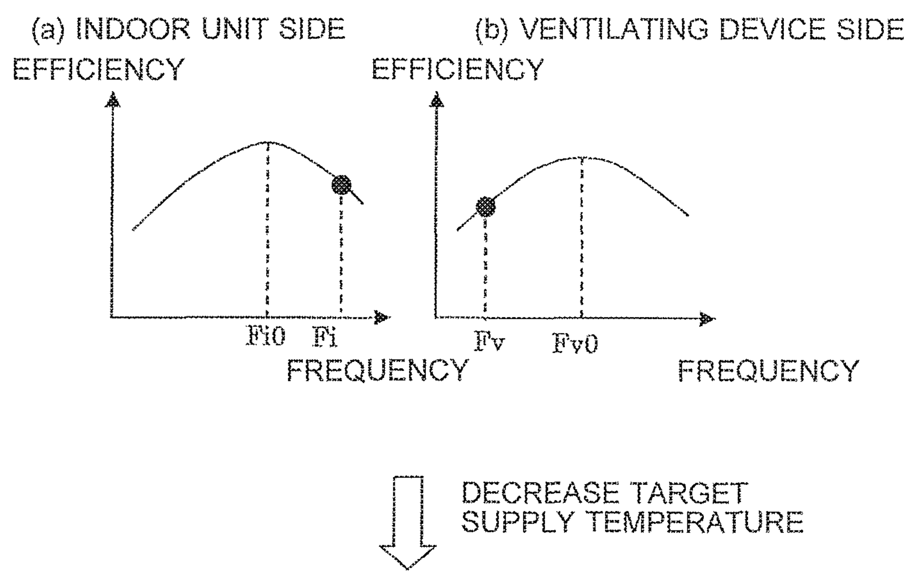
FIG. 8 is a diagram explaining a target supply temperature control action of the air conditioning system according to Embodiment 1 of the present invention.
Figure 8:
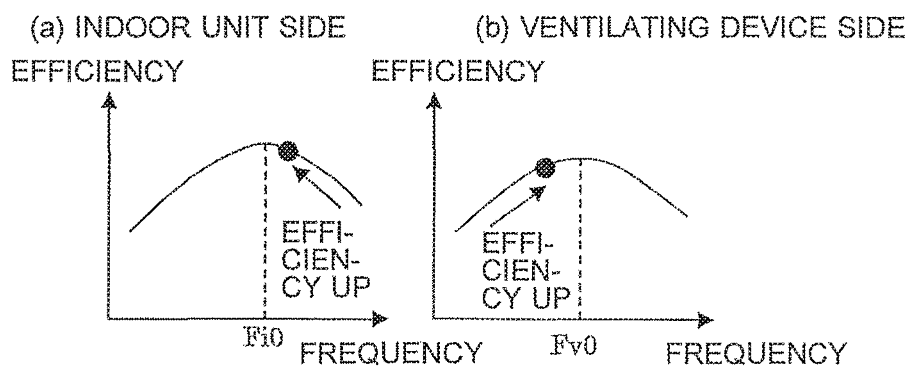

FIGS. 6 to 8 are diagrams explaining a target supply temperature control action of the air conditioning system according to Embodiment 1 of the present invention.

(Case in which Fi<Fi0 and Fv<Fv0)

As illustrated in FIG. 6, when the load of the indoor space 200 (temperature load) is small, the operating frequency Fi of the compressor 12 of the first refrigerant subsystem 11 becomes much lower than the frequency Fi0 at which the efficiency of the compressor 12 is maximized, resulting in inefficient operation in some cases. Also, when the load of the outdoor air OA (temperature load) is small, the operating frequency Fv of the compressor 22 of the second refrigerant subsystem 21 becomes much lower than the frequency Fv0 at which the efficiency of the compressor 22 is maximized, resulting in inefficient operation in some cases.

In such cases, the target supply temperature of the second refrigerant subsystem 21 is increased. Thus, the operation of the compressor 22 of the second refrigerant subsystem 21 stops, the amount of heat exchange to be processed by the first refrigerant subsystem 11 increases, and the operating frequency of the compressor 12 increases.

As a result, the operating frequency Fi of the compressor 12 approximates the frequency Fi0 to improve the operating efficiency.

In this way, by concentrating operation on the first refrigerant subsystem 11 rather than operating both the first refrigerant subsystem 11 and the second refrigerant subsystem 21, the total power consumption of the air conditioning system 100 as a whole can be reduced.

(Case in which Fi<Fi0 and Fv>Fv0)

As illustrated in FIG. 7, when the load of the indoor space 200 (temperature load) is small, the operating frequency Fi of the compressor 12 of the first refrigerant subsystem 11 becomes much lower than the frequency Fi0 at which the efficiency of the compressor 12 is maximized, resulting in inefficient operation in some cases. Also, when the load of the outdoor air OA (temperature load) is large, the operating frequency Fv of the compressor 22 of the second refrigerant subsystem 21 becomes much higher than the frequency Fv0 at which the efficiency of the compressor 22 is maximized, resulting in inefficient operation in some cases.

In such cases, the target supply temperature of the second refrigerant subsystem 21 is increased. Thus, the amount of heat exchange to be processed by the second refrigerant subsystem 21 decreases, and the operating frequency of the compressor 22 lowers. Also, the amount of heat exchange to be processed by the first refrigerant subsystem 11 increases, and the operating frequency of the compressor 12 increases.

As a result, the operating frequency Fi of the compressor 12 approximates the frequency Fi0, and the operating frequency Fv of the compressor 22 approximates the frequency Fv0, to improve the operating efficiency.

In this way, by adjusting the capacity balance between the first refrigerant subsystem 11 and the second refrigerant subsystem 21, the total power consumption of the air conditioning system 100 as a whole can be reduced.

(Case in which Fi>Fi0 and Fv<Fv0)

As illustrated in FIG. 8, when the load of the indoor space 200 (temperature load) is large, the operating frequency Fi of the compressor 12 of the first refrigerant subsystem 11 becomes much higher than the frequency Fi0 at which the efficiency of the compressor 12 is maximized, resulting in inefficient operation in some cases. Also, when the load of the outdoor air OA (temperature load) is small, the operating frequency Fv of the compressor 22 of the second refrigerant subsystem 21 becomes much lower than the frequency Fv0 at which the efficiency of the compressor 22 is maximized, resulting in inefficient operation in some cases.

In such cases, the target supply temperature of the second refrigerant subsystem 21 is decreased. Thus, the amount of heat exchange to be processed by the second refrigerant subsystem 21 increases, and the operating frequency of the compressor 22 increases. Also, the amount of heat exchange to be processed by the first refrigerant subsystem 11 decreases, and the operating frequency of the compressor 12 lowers.

As a result, the operating frequency Fi of the compressor 12 approximates the frequency Fi0, and the operating frequency Fv of the compressor 22 approximates the frequency Fv0, to improve the operating efficiency.

In this way, by adjusting the capacity balance between the first refrigerant subsystem 11 and the second refrigerant subsystem 21, the total power consumption of the air conditioning system 100 as a whole can be reduced.

(Case in which Fi>Fi0 and Fv>Fv0)

In some cases, the loads (temperature loads) of the indoor space 200 and the outdoor air OA are both large, the operating frequency Fi of the compressor 12 is higher than the frequency Fi0, and the operating frequency Fv of the compressor 22 is higher than the frequency Fv0.

In such cases, each of temperature loads has to be processed in the first refrigerant subsystem 11 and the second refrigerant subsystem 21, the target supply temperature is not changed, and the current set value is maintained.

Meanwhile, in addition to the action of changing the target supply temperature discussed above, the target indoor temperature of the first refrigerant subsystem 11 may also be changed to thereby approximate the operating frequency of the compressor 12 and the operating frequency of the compressor 22 to the respective high-efficiency frequencies.

However, changing the target indoor temperature directly affects the comfort of the indoor space 200. For this reason, in Embodiment 1, the target supply temperature is changed to perform operation for improving the operating efficiency, while the target indoor temperature is kept constant to minimize the reduction in comfort.

(Details of Control of Target Supply Temperature)

In the central controller 102 (set value control unit), information about the frequency Fi0 at which the operating efficiency of the compressor 12 is maximized, and information about the frequency Fv0 at which the operating efficiency of the compressor 22 is maximized, are set (stored) in advance.

The central controller 102 changes the target supply temperature based on the magnitude relationship between the current operating frequency Fi of the compressor 12 and the frequency Fi0 at which the operating efficiency of the compressor 12 is maximized, and the magnitude relationship between the current operating frequency Fv of the compressor 22 and the frequency Fv0 at which the operating efficiency of the compressor 22 is maximized. Subsequently, the central controller 102 transmits information about the target supply temperature to the compressor frequency control unit 51.

Details of such an action will be described with reference to FIG. 9.

Figure 9:
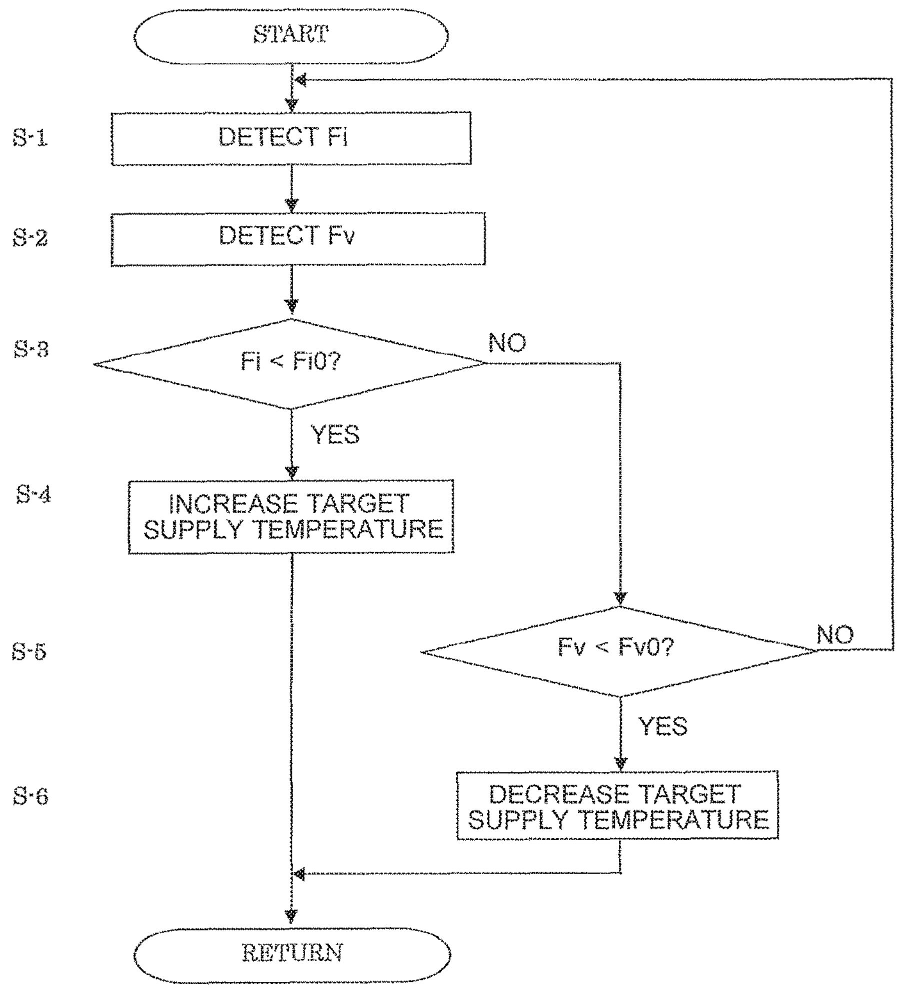
FIG. 9 is a flowchart illustrating an action of the air conditioning system according to Embodiment 1 of the present invention.

FIG. 9 is a flowchart illustrating an action of the air conditioning system according to Embodiment 1 of the present invention.

The central controller 102 acquires information about the current operating frequency Fi of the compressor 12 of the first refrigerant subsystem 11 from the compressor frequency control unit 41 (S-1).

The central controller 102 acquires information about the current operating frequency Fv of the compressor 22 of the second refrigerant subsystem 21 from the compressor frequency control unit 51 (S-2).

The central controller 102 determines whether or not the current operating frequency Fi of the compressor 12 is lower than the frequency Fi0 at which the operating efficiency of the compressor 12 is maximized (S-3).

When the current operating frequency Fi of the compressor 12 is lower than the frequency Fi0 at which the operating efficiency of the compressor 12 is maximized (S-3, yes), the central controller 102 increases the set value of the target supply temperature, and transmits information about the changed set value of the target supply temperature to the compressor frequency control unit 51 (S-4).

Consequently, the compressor frequency control unit 51 controls the operating frequency of the compressor 22 based on the changed set value of the target supply temperature.

On the other hand, when the current operating frequency Fi of the compressor 12 is not lower than the frequency Fi0 at which the operating efficiency of the compressor 12 is maximized (S-3, no), the central controller 102 determines whether or not the current operating frequency Fv of the compressor 22 is lower than the frequency Fv0 at which the operating efficiency of the compressor 22 is maximized (S-5).

When the current operating frequency Fv of the compressor 22 is lower than the frequency Fv0 at which the operating efficiency of the compressor 22 is maximized (S-5, yes), the central controller 102 decreases the set value of the target supply temperature, and transmits information about the changed set value of the target supply temperature to the compressor frequency control unit 51 (S-6).

Consequently, the compressor frequency control unit 51 controls the operating frequency of the compressor 22 based on the changed set value of the target supply temperature.

At this point, the amount of variation of the target supply temperature is set to a preset temperature (such as 5 degrees C.). Thus, even when the amount of variation is set to a fixed value, by repeatedly performing this process, the frequency ultimately approximates the frequency at which efficiency is maximized.

Note that the amount of variation of the target supply temperature may also be increased as the difference increases between the current operating frequency Fi of the compressor 12 and the frequency Fi0 at which efficiency is maximized. Additionally, the amount of variation of the target supply temperature may also be increased as the difference increases between the current operating frequency Fv of the compressor 22 and the frequency Fv0 at which efficiency is maximized.

Thus, by increasing the amount of variation as the frequency difference increases, the control speed can be increased to make the frequency to approximate the frequency at which efficiency is maximized.

Also, by reducing the amount of variation as the frequency difference decreases, the operating frequencies of the compressors 12 and 22 can be brought precisely close to the frequencies at which the operating efficiency is maximized.

(Advantageous Effects)

In Embodiment 1 as above, in the air conditioning system 100 equipped with the first refrigerant subsystem 11 that serves as the indoor unit subsystem and the second refrigerant subsystem 21 that serves as the ventilating device subsystem, by adjusting the capacity balance between the first refrigerant subsystem 11 and the second refrigerant subsystem 21, the total power consumption of the air conditioning system 100 as a whole can be reduced.

Additionally, the target supply temperature is changed based on the magnitude relationship between the current operating frequency Fi of the compressor 12 and the frequency Fi0, and the magnitude relationship between the current operating frequency Fv of the compressor 22 and the frequency Fv0. For this reason, energy efficiency can be improved with a simple determination process, without computational processes such as the air conditioning load estimation.

In addition, by not changing the target indoor temperature of the first refrigerant subsystem 11 that serves as the indoor unit subsystem and instead changing the target supply temperature of the second refrigerant subsystem 21 that serves as the ventilating device subsystem, operation for improving the operating efficiency is performed, while the target indoor temperature is kept constant to minimize the reduction in comfort.

Note that in Embodiment 1, the capacity balance (heat processing distribution) between the first refrigerant subsystem 11 and the second refrigerant subsystem 21 is determined by changing the target supply temperature of the ventilating device 3, but the operating frequency of the compressor 22 of the second refrigerant subsystem 21 may also be controlled directly.

In other words, when the current operating frequency Fi of the compressor 12 is less than the frequency Fi0 and the current operating frequency Fv of the compressor 22 is less than the frequency Fv0, the operating frequency Fv of the compressor 22 is increased.

Also, when the current operating frequency Fi of the compressor 12 is less than the frequency Fi0 and the current operating frequency Fv of the compressor 22 is greater than the frequency Fv0, the operating frequency Fv of the compressor 22 is increased.

Also, when the current operating frequency Fi of the compressor 12 is greater than the frequency Fi0 and the current operating frequency Fv of the compressor 22 is greater than the frequency Fv0, the operating frequency Fv of the compressor 22 is decreased.

Even with such an action, the advantageous effects discussed above may be exhibited.

(Modification 1)

Figure 10:
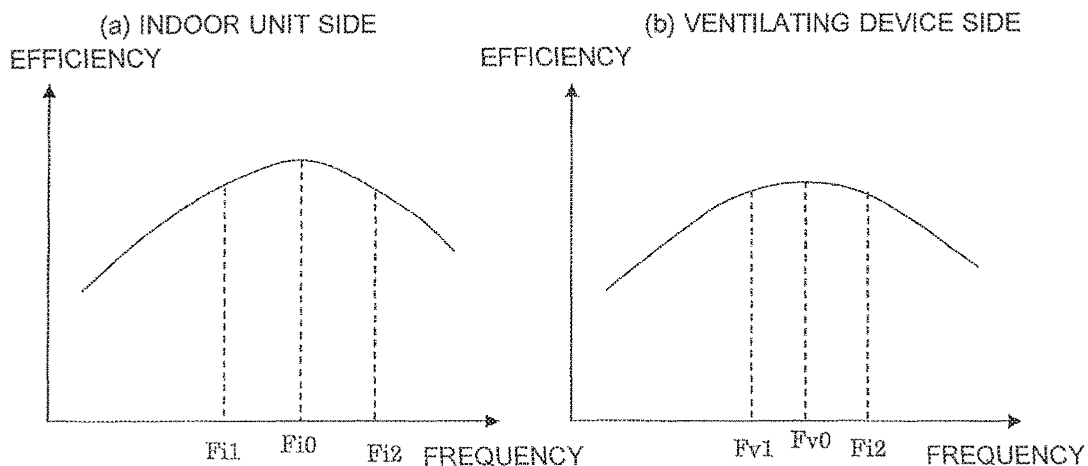
FIG. 10 is a diagram illustrating Modification 1 of a target supply temperature control action of the air conditioning system according to Embodiment 1 of the present invention.

FIG. 10 is a diagram illustrating Modification 1 of a target supply temperature control action of the air conditioning system according to Embodiment 1 of the present invention.

As illustrated in FIG. 10 (*a*), a first frequency range ($Fi1<Fi0<Fi2$) that is a range of frequencies including the frequency Fi0 may be preset, and the target supply temperature may be changed when the current operating frequency Fi of the compressor 12 is not within the first frequency range. In other words, the frequency range within which the target supply temperature is to be changed is less than or equal to Fi1 ($Fi1<Fi0$) or equal to or greater than Fi2 ($Fi2>Fi0$).

Also, as illustrated in FIG. 10 (*b*), a second frequency range ($Fv1<Fv0<Fv2$) that is a range of frequencies including the frequency Fv0 may be preset, and the target supply temperature may be changed when the current operating frequency Fv of the compressor 22 is not within the second frequency range. In other words, the frequency range within which the target supply temperature is to be changed is less than or equal to Fv1 ($Fv1<Fv0$) or equal to or greater than Fv2 ($Fv2>Fv0$).

By such an action, the target supply temperature is not changed when the operating frequencies of the compressors 12 and 22 are in a highly efficient operating frequency range, thereby achieving a stable action and improving the operating efficiency by minimizing the frequency of changing the target supply temperature.

(Modification 2)

After the target supply temperature is changed, the target supply temperature may also be changed again after a preset time elapses.

Hereinafter, the differences from FIG. 9 will be mainly described with reference to FIG. 11.

Figure 11:
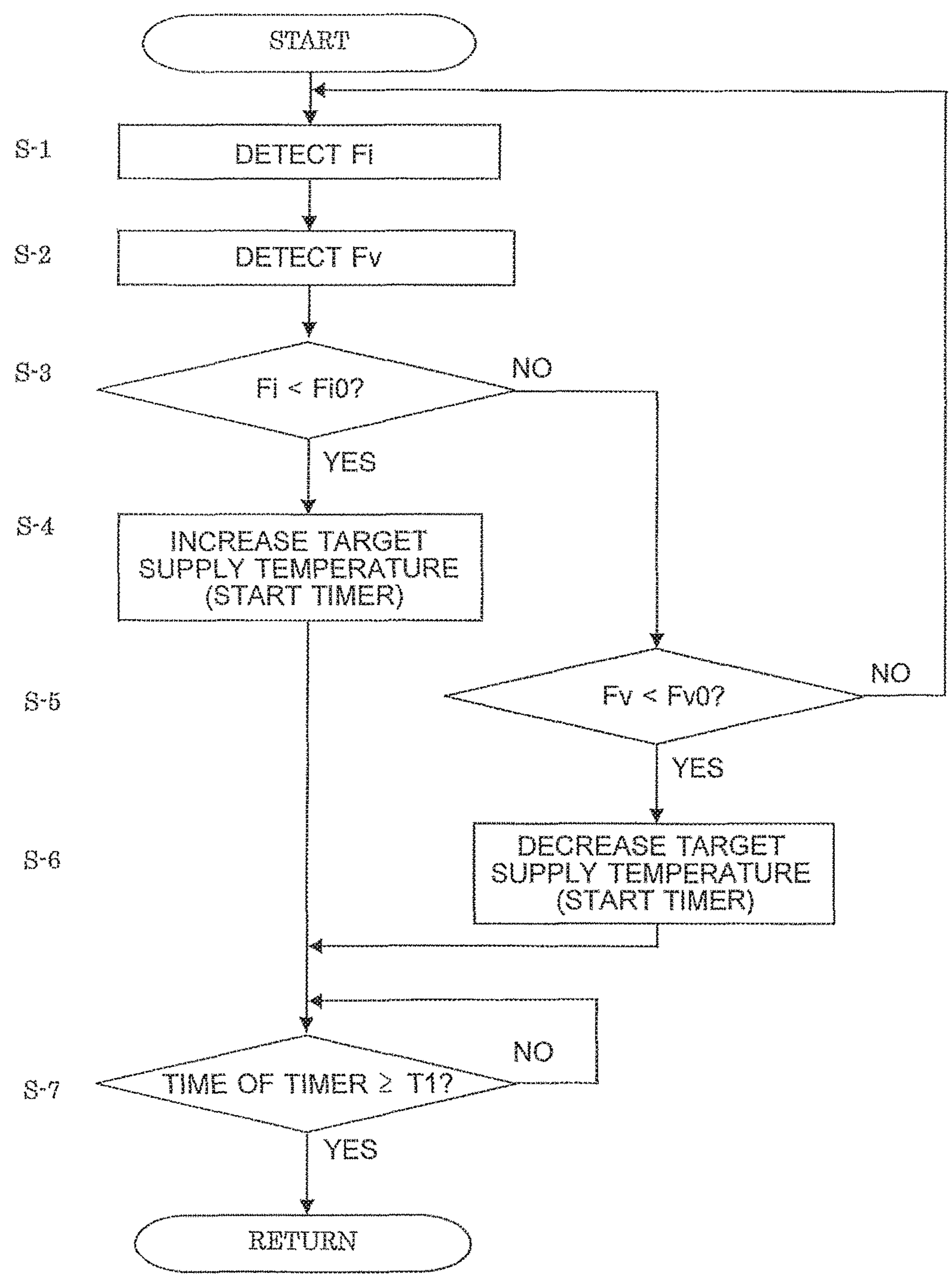
FIG. 11 is a flowchart illustrating Modification 2 of an action of the air conditioning system according to Embodiment 1 of the present invention.

FIG. 11 is a flowchart illustrating Modification 2 of an action of the air conditioning system according to Embodiment 1 of the present invention.

As illustrated in FIG. 11, when the target supply temperature is increased in S-4, a timer is started. Also, when the target supply temperature is increased in S-6, a timer is started.

The central controller 102 determines whether or not a time of the timer is equal to or greater than a preset time T1 (S-7). Subsequently, when the time of the timer is equal to or greater than the preset time T1, the action from S-1 is performed again.

By such an action, after the set value of the target supply temperature is changed and the operating states of the first refrigerant subsystem 11 and the second refrigerant subsystem 21 stabilize, the operating efficiency of the compressors 12 and 22 is determined again. Thus, the operating frequencies of the compressors 12 and 22 can be brought precisely close to the frequencies at which efficiency is maximized.

(Modification 3)

The above description illustrates a case in which each of the first refrigerant subsystem 11 that serves as the indoor unit subsystem and the second refrigerant subsystem 21 that serves as the ventilating device subsystem is one, but the number of each of the first refrigerant subsystems 11 and the second refrigerant subsystems 21 may be an arbitrary number.

Figure 12:
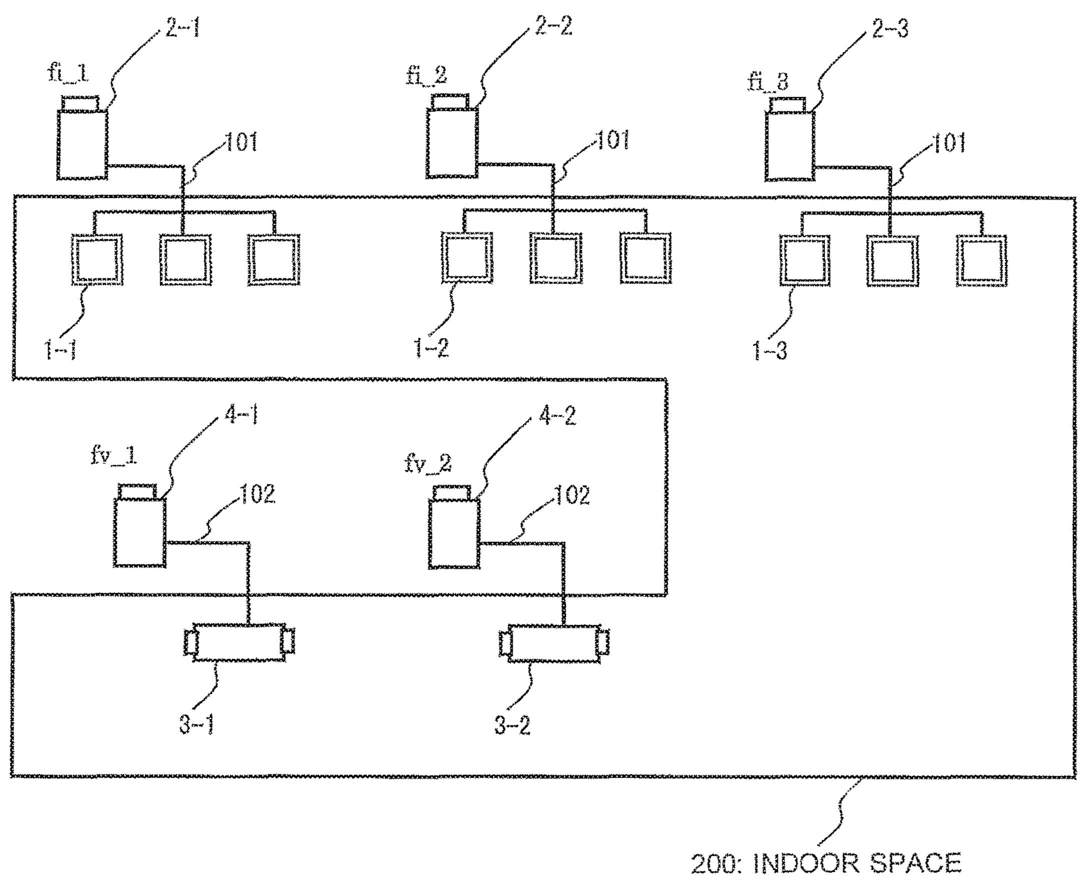
FIG. 12 is a schematic diagram illustrating Modification 3 of the air conditioning system according to Embodiment 1 of the present invention.

FIG. 12 is a schematic diagram illustrating Modification 3 of the air conditioning system according to Embodiment 1 of the present invention.

As illustrated in FIG. 12, a configuration equipped with three first refrigerant subsystems 11 and two second refrigerant subsystems 21 that air-condition the same indoor space 200 is also possible.

In this configuration equipped with multiple refrigerant subsystems, the central controller 102 treats the average value of the operating frequency of the compressor 12 in each of the multiple first refrigerant subsystems 11 as the current operating frequency Fi of the compressor 12. Additionally, the central controller 102 treats the average value of the operating frequency of the compressor 22 in each of the multiple second refrigerant subsystems 21 as the current operating frequency Fv of the compressor 22.

For example, in the example of FIG. 12, when fi_1 to fi_3 are assumed to be the respective operating frequencies of the compressors 12 in the three first refrigerant subsystems 11, the current operating frequency of the compressor 12 is obtained by Fi=(fi_1+fi_2+fi_3)/3.

Also, when fv_1 and fv_2 are assumed to be the respective operating frequencies of the compressors 22 in the two second refrigerant subsystems 21, the current operating frequency of the compressor 22 is obtained by Fv=(fv_1+fv_2)/2.

Even with such a configuration, by performing the action discussed above, the capacity balance between the first refrigerant subsystems 11 and the second refrigerant subsystems 21 may be adjusted, and the total power consumption of the air conditioning system 100 as a whole can be reduced.

Embodiment 2

The air conditioning system according to Embodiment 2 changes the set value of the target supply temperature based on the evaporating temperature of the first refrigerant subsystem 11 and the evaporating temperature of the second refrigerant subsystem 21.

Note that the configuration of the air conditioning system and the configuration of the refrigerant subsystems according to Embodiment 2 are similar to the configurations of Embodiment 1 (see FIGS. 1 and 2), and the same components are denoted by the same reference signs.

Hereinafter, the differences from Embodiment 1 will be mainly described.

Figure 13:
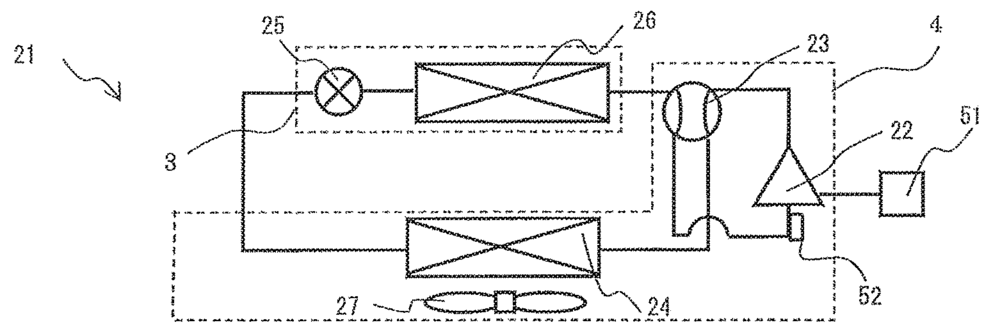
FIG. 13 is a schematic diagram of refrigerant subsystems according to Embodiment 2 of the present invention.
Figure 13:
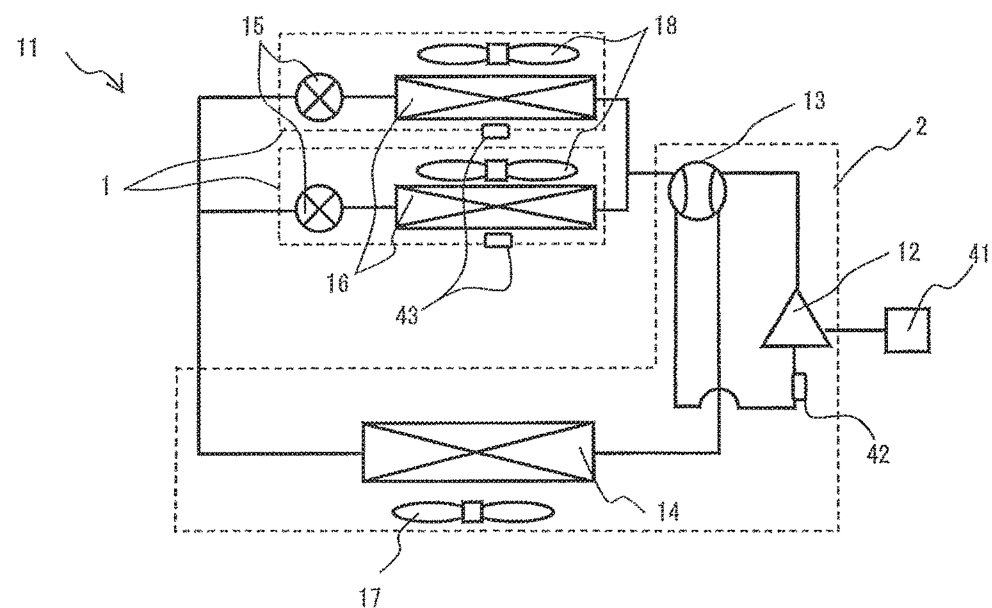

FIG. 13 is a schematic diagram of refrigerant subsystems according to Embodiment 2 of the present invention.

As illustrated in FIG. 13, the first refrigerant subsystem 11 is equipped with an evaporating temperature detection unit 42, in addition to the configuration of Embodiment 1 above.

The evaporating temperature detection unit 42 detects the temperature of refrigerant suctioned into the compressor 12.

The compressor frequency control unit 41 transmits information about the detection value from the evaporating temperature detection unit 42 to the central controller 102.

The second refrigerant subsystem 21 is equipped with an evaporating temperature detection unit 52, in addition to the configuration of Embodiment 1 above.

The evaporating temperature detection unit 52 detects the temperature of refrigerant suctioned into the compressor 22.

The compressor frequency control unit 51 transmits information about the detection value from the evaporating temperature detection unit 52 to the central controller 102.

The central controller 102 changes the set value of the target supply temperature based on the detection values from the evaporating temperature detection unit 42 and the evaporating temperature detection unit 52, and transmits information about the target supply temperature to the compressor frequency control unit 51. Details will be discussed later.

Note that the evaporating temperature detection unit 42 and the evaporating temperature detection unit 52 may be constituted of a sensor device.

(Relationship Between Evaporating Temperature and Efficiency)

Figure 14:
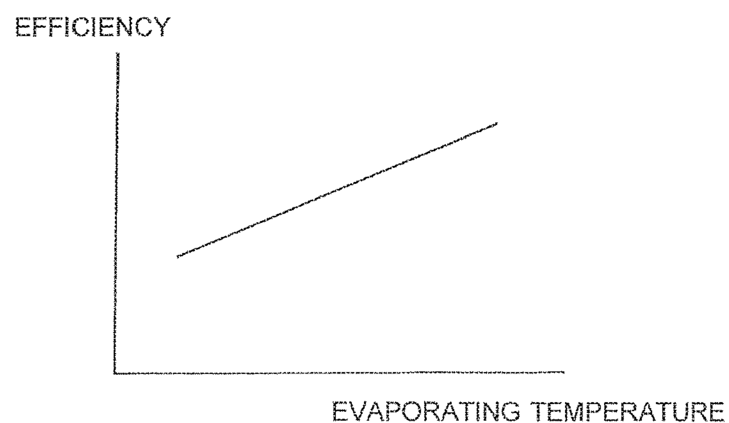
FIG. 14 is a diagram illustrating the relationship between evaporating temperature and efficiency in a typical refrigerant circuit.

FIG. 14 is a diagram illustrating the relationship between evaporating temperature and efficiency in a typical refrigerant circuit.

As illustrated in FIG. 14, the efficiency has a characteristic of changing depending on the evaporating temperature, in which the efficiency becomes lower as the evaporating temperature lowers.

In other words, as the evaporating temperature of the first refrigerant subsystem 11 becomes lower, the ratio of the power consumed by the compressor 12 to the amount of heat exchange (capacity) of the first refrigerant subsystem 11 increases, and the efficiency of the first refrigerant subsystem 11 falls.

Also, as the evaporating temperature of the second refrigerant subsystem 21 becomes lower, the ratio of the power consumed by the compressor 22 to the amount of heat exchange (capacity) of the second refrigerant subsystem 21 increases, and the efficiency of the second refrigerant subsystem 21 falls.

The total efficiency of the air conditioning system 100 as a whole is the ratio of the power consumed by the compressors 12 and 22 to the amount of heat exchange (capacity) of the air conditioning system 100 as a whole. For this reason, between the first refrigerant subsystem 11 and the second refrigerant subsystem 21, the efficiency of the one with the greater amount of heat exchange has a larger influence on the efficiency of the air conditioning system 100 as a whole.

In other words, between the first refrigerant subsystem 11 and the second refrigerant subsystem 21, by increasing the evaporating temperature of the one with the greater amount of heat exchange and lowering the evaporating temperature of the one with the lower amount of heat exchange, an efficiency in the air conditioning system 100 as a whole can be improved while the load inside the indoor space 200 is processed.

(Overview of Control of Target Supply Temperature)

Figure 15:
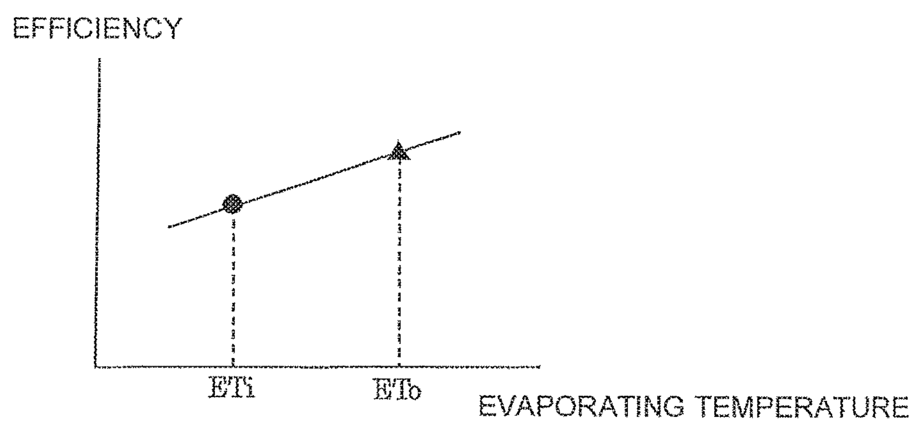
FIG. 15 is a diagram explaining a target supply temperature control action of an air conditioning system according to Embodiment 2 of the present invention.
Figure 15:
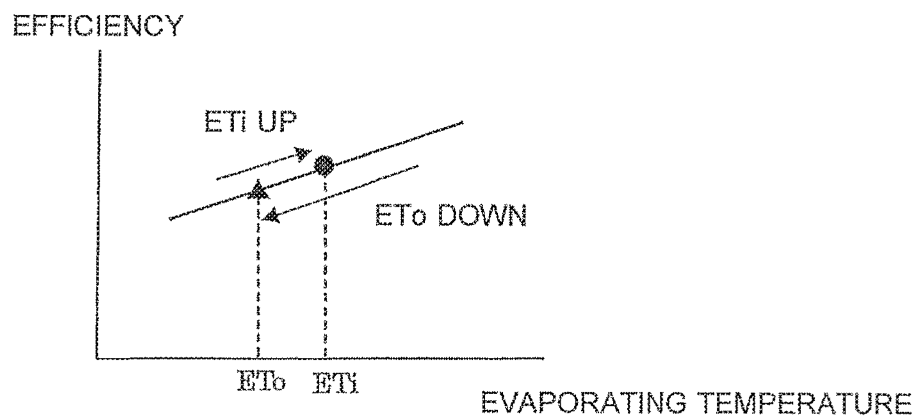
Figure 16:
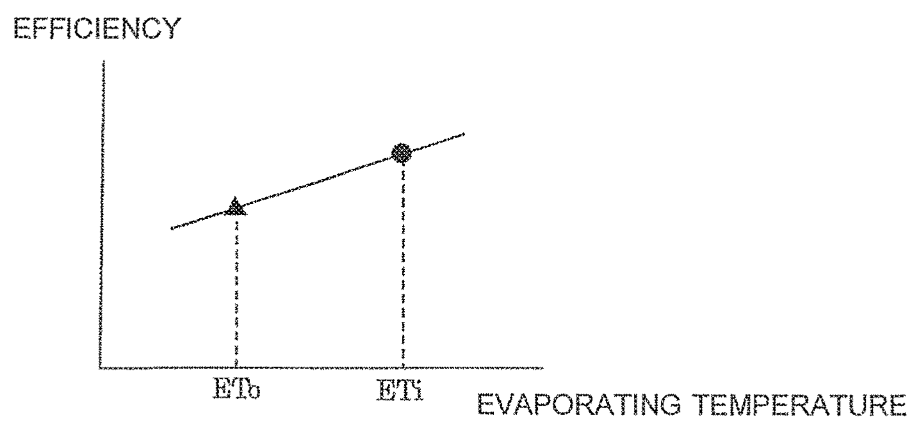
FIG. 16 is a diagram explaining a target supply temperature control action of the air conditioning system according to Embodiment 2 of the present invention.
Figure 16:
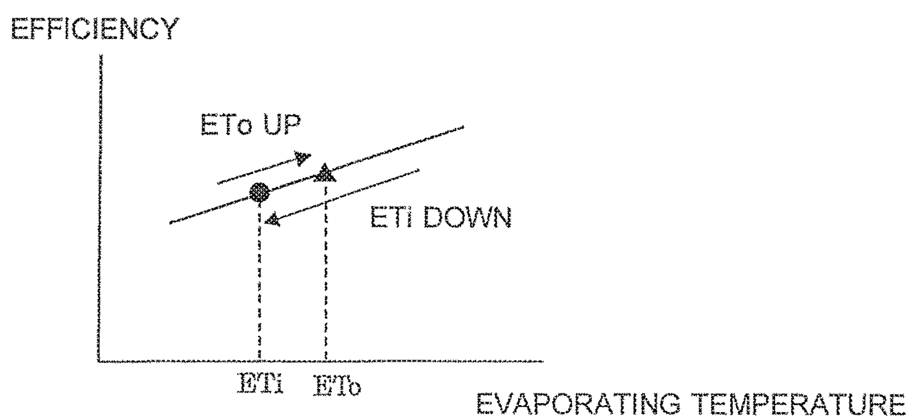

FIGS. 15 and 16 are diagrams explaining a target supply temperature control action of the air conditioning system according to Embodiment 2 of the present invention.

(Amount of Heat Exchange in Indoor Heat Exchanger 16>Amount of Heat Exchange in Cooler 26)

When the amount of heat exchange in the indoor heat exchanger 16 is greater than the amount of heat exchange in the cooler 26, the efficiency of the first refrigerant subsystem 11 has a greater influence than the efficiency of the second refrigerant subsystem 21 on the efficiency of the air conditioning system 100 as a whole.

In such a configuration, when the evaporating temperature ETi of the first refrigerant subsystem 11 is less than the evaporating temperature ETo of the second refrigerant subsystem 21, as illustrated in FIG. 15, the efficiency of the first refrigerant subsystem 11 becomes lower than the efficiency of the second refrigerant subsystem 21, leading to inefficient operation of the air conditioning system 100 as a whole in some cases.

For this reason, in a configuration in which the amount of heat exchange in the indoor heat exchanger 16 is greater than the amount of heat exchange in the cooler 26, when the evaporating temperature ETi of the first refrigerant subsystem 11 is less than the evaporating temperature ETo of the second refrigerant subsystem 21, the target supply temperature of the second refrigerant subsystem 21 is decreased.

Thus, the load to be processed by the second refrigerant subsystem 21 increases, and the evaporating temperature ETo of the second refrigerant subsystem 21 falls. Also, the load to be processed by the first refrigerant subsystem 11 decreases, and the evaporating temperature ETi of the first refrigerant subsystem 11 increases.

As a result, the efficiency of the first refrigerant subsystem 11 improves to improve the efficiency of the air conditioning system 100 as a whole.

Thus, by adjusting the capacity balance between the first refrigerant subsystem 11 and the second refrigerant subsystem 21, the total power consumption of the air conditioning system 100 as a whole can be reduced.

Note that when the evaporating temperature ETi of the first refrigerant subsystem 11 is equal to or greater than the evaporating temperature ETo of the second refrigerant subsystem 21, the target supply temperature is not changed, and the current set value is maintained.

(Amount of Heat Exchange in Indoor Heat Exchanger 16<Amount of Heat Exchange in Cooler 26)

When the amount of heat exchange in the cooler 26 is greater than the amount of heat exchange in the indoor heat exchanger 16, the efficiency of the second refrigerant subsystem 21 has a greater influence than the efficiency of the first refrigerant subsystem 11 on the efficiency of the air conditioning system 100 as a whole.

In such a configuration, when the evaporating temperature ETo of the second refrigerant subsystem 21 is less than the evaporating temperature ETi of the first refrigerant subsystem 11, as illustrated in FIG. 16, the efficiency of the second refrigerant subsystem 21 becomes lower than the efficiency of the first refrigerant subsystem 11, leading to inefficient operation of the air conditioning system 100 as a whole in some cases.

For this reason, in a configuration in which the amount of heat exchange in the cooler 26 is greater than the amount of heat exchange in the indoor heat exchanger 16, when the evaporating temperature ETo of the second refrigerant subsystem 21 is less than the evaporating temperature ETi of the first refrigerant subsystem 11, the target supply temperature of the second refrigerant subsystem 21 is increased.

Thus, the load to be processed by the second refrigerant subsystem 21 decreases, and the evaporating temperature ETo of the second refrigerant subsystem 21 increases. Also, the load to be processed by the first refrigerant subsystem 11 increases, and the evaporating temperature ETi of the first refrigerant subsystem 11 falls.

As a result, the efficiency of the second refrigerant subsystem 21 improves to improve the efficiency of the air conditioning system 100 as a whole.

Thus, by adjusting the capacity balance between the first refrigerant subsystem 11 and the second refrigerant subsystem 21, the total power consumption of the air conditioning system 100 as a whole can be reduced.

Note that when the evaporating temperature ETo of the second refrigerant subsystem 21 is equal to or greater than the evaporating temperature ETi of the first refrigerant subsystem 11, the target supply temperature is not changed, and the current set value is maintained.

At this point, the amount of variation of the target supply temperature is set to a preset temperature (such as 5 degrees C.). Thus, even when the amount of variation is set to a fixed value, by repeatedly performing the changing action discussed above, the frequency ultimately approximates the frequency at which efficiency is maximized.

Note that the amount of variation of the target supply temperature may also be increased as the difference increases between the evaporating temperature ETi of the first refrigerant subsystem 11 and the evaporating temperature ETo of the second refrigerant subsystem 21.

Thus, by increasing the amount of variation as the evaporating temperature difference increases, the control speed can be increased to make the evaporating temperature to be an evaporating temperature at which efficiency improves.

(Advantageous Effects)

In Embodiment 2 as above, in the air conditioning system 100 equipped with the first refrigerant subsystem 11 that serves as the indoor unit subsystem and the second refrigerant subsystem 21 that serves as the ventilating device subsystem, by adjusting the capacity balance between the first refrigerant subsystem 11 and the second refrigerant subsystem 21, the total power consumption of the air conditioning system 100 as a whole can be reduced.

In addition, the target supply temperature is changed based on the magnitude relationship between the evaporating temperature ETi of the first refrigerant subsystem 11 and the evaporating temperature ETo of the second refrigerant subsystem 21. For this reason, energy efficiency can be improved with a simple determination process, without computational processes such as the air conditioning load estimation.

In addition, the target supply temperature of the first refrigerant subsystem 11 that serves as the indoor unit subsystem is not changed, but the target supply temperature of the second refrigerant subsystem 21 that serves as the ventilating device subsystem is changed, thereby performing operation for improving the operating efficiency, while the target indoor temperature may be kept constant to minimize the reduction in comfort.

(Modification 1)

The target supply temperature may also be changed when the temperature difference between the evaporating temperature ETi of the first refrigerant subsystem 11 and the evaporating temperature ETo of the second refrigerant subsystem 21 is equal to or greater than a preset temperature difference.

By such an action, the target supply temperature is not changed when the temperature difference between the evaporating temperature ETi of the first refrigerant subsystem 11 and the evaporating temperature ETo of the second refrigerant subsystem 21 is less than the preset temperature difference, thereby achieving a stable action and improving the operating efficiency by minimizing the frequency of changing the target supply temperature.

(Modification 2)

After the target supply temperature is changed based on the magnitude relationship between the evaporating temperature ETi of the first refrigerant subsystem 11 and the evaporating temperature ETo of the second refrigerant subsystem 21, the target supply temperature may also be changed again after a preset time elapses.

By such an action, after the set value of the target supply temperature is changed and the operating states of the first refrigerant subsystem 11 and the second refrigerant subsystem 21 stabilize, the magnitude relationship between the evaporating temperature ETi of the first refrigerant subsystem 11 and the evaporating temperature ETo of the second refrigerant subsystem 21 is determined again. Thus, the evaporating temperature ETi of the first refrigerant subsystem 11 and the evaporating temperature ETo of the second refrigerant subsystem 21 may be brought precisely close to evaporating temperatures at which efficiency is improved.

(Modification 3)

The above description illustrates a case in which each of the first refrigerant subsystem 11 that serves as the indoor unit subsystem and the second refrigerant subsystem 21 that serves as the ventilating device subsystem is one, but the number of each of the first refrigerant subsystems 11 and the second refrigerant subsystems 21 may be an arbitrary number.

Figure 17:
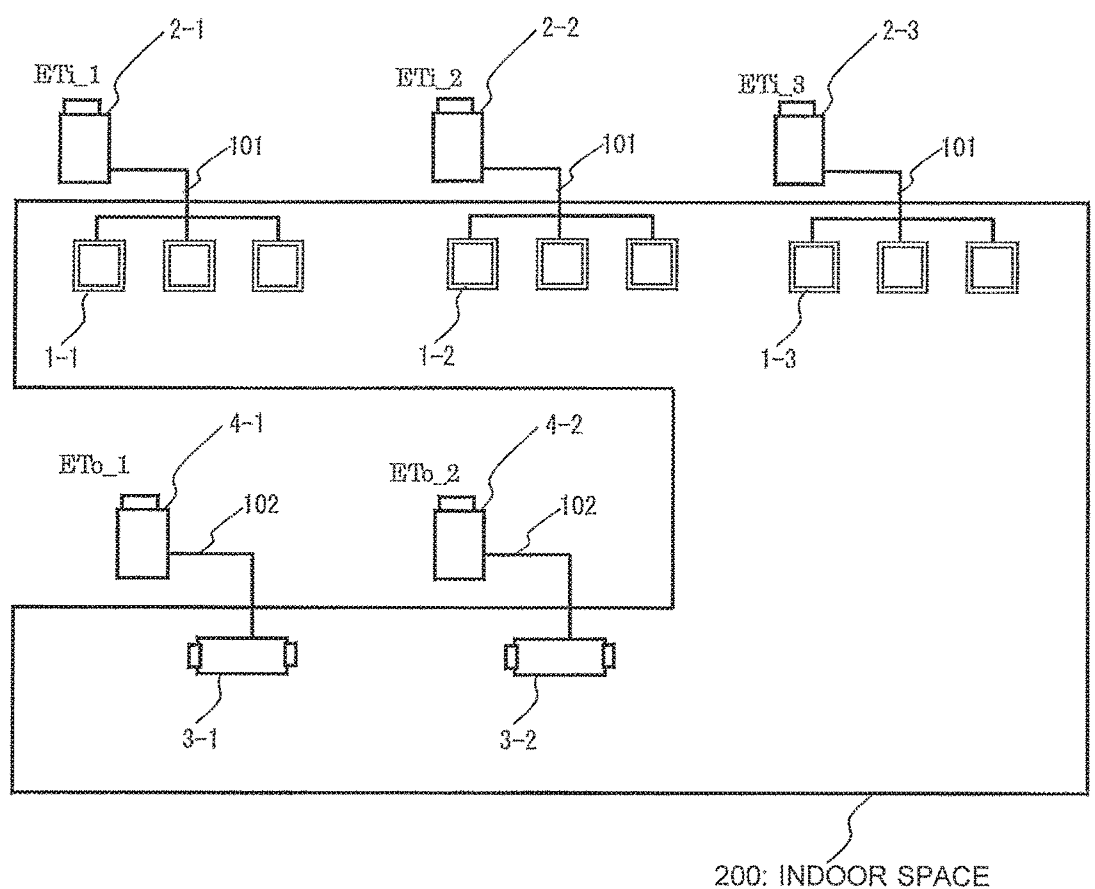
FIG. 17 is a schematic diagram illustrating Modification 3 of the air conditioning system according to Embodiment 2 of the present invention.

FIG. 17 is a schematic diagram illustrating Modification 3 of the air conditioning system according to Embodiment 2 of the present invention.

As illustrated in FIG. 17, a configuration equipped with three first refrigerant subsystems 11 and two second refrigerant subsystems 21 that air-condition the same indoor space 200 is also possible.

In this configuration equipped with multiple refrigerant subsystems, the central controller 102 treats the average value of the evaporating temperature in each of the multiple first refrigerant subsystems 11 as the evaporating temperature ETi of the first refrigerant subsystem 11. Additionally, the central controller 102 treats the average value of the evaporating temperature in each of the multiple second refrigerant subsystems 21 as the evaporating temperature ETo of the second refrigerant subsystem 21.

For example, in the example of FIG. 17, when ETi_1 to ETi_3 are assumed to be the respective evaporating temperatures in the three first refrigerant subsystems 11, the current evaporating temperature of the first refrigerant subsystem 11 is obtained by $ETi=(ETi\_1+ETi\_2+ETi\_3)/3$.

Also, when ETo_1 and ETo_2 are assumed to be the respective evaporating temperatures in the two second refrigerant subsystems 21, the current evaporating temperature of the second refrigerant subsystem 21 is obtained by $ETo=(ETo\_1+ETo\_2)/2$.

Even with such a configuration, by performing the action discussed above, the capacity balance between the first refrigerant subsystems 11 and the second refrigerant subsystems 21 may be adjusted, and the total power consumption of the air conditioning system 100 as a whole can be reduced.

REFERENCE SIGNS LIST

1 indoor unit 2 outdoor unit on the indoor unit subsystem 3 ventilating device 4 outdoor unit on the ventilating device subsystem 11 first refrigerant subsystem 12 compressor 13 four-way valve 14 outdoor heat exchanger 15 expansion valve 16 indoor heat exchanger 17 fan 18 fan 21 second refrigerant subsystem 22 compressor 23 four-way valve 24 outdoor heat exchanger 25 expansion valve 26 cooler 27 fan 28 air supply fan 29 exhaust fan 30 supply air temperature detection unit 41 compressor frequency control unit 42 evaporating temperature detection unit 43 inlet temperature and humidity detection unit 51 compressor frequency control unit 52 evaporating temperature detection unit 100 air conditioning system 102 central controller 103 transmission line 104 refrigerant pipe 105 refrigerant pipe 200 indoor space

The invention claimed is:

1. An air conditioning system, comprising:

a first refrigerant circuit in which a first compressor and an indoor heat exchanger are included, and through which refrigerant circulates;

an indoor unit configured to cause indoor air in an indoor space to pass through the indoor heat exchanger, and provide the indoor air to the indoor space;

a second refrigerant circuit in which a second compressor and a heat exchanger for ventilation are included, and through which refrigerant circulates;

a ventilating device configured to introduce outdoor air from an outdoor space, cause the outdoor air to pass through the heat exchanger for ventilation, and provide supply air to the indoor space; and a controller configured to control an operating frequency of the first compressor so that a temperature of the indoor air becomes a target indoor temperature, control an operating frequency of the second compressor so that a temperature of the supply air becomes a target supply temperature, and change a set value of the target supply temperature based on the operating frequency of the first compressor and the operating frequency of the second compressor.

2. The air conditioning system of claim 1, wherein the controller is further configured to change the target supply temperature based on a magnitude relationship between the operating frequency of the first compressor and a first frequency at which an operating efficiency of the first compressor reaches a maximum, and a magnitude relationship between the operating frequency of the second compressor and a second frequency at which an operating efficiency of the second compressor reaches a maximum.

3. The air conditioning system of claim 2, wherein the controller is further configured to increase the target supply temperature when the operating frequency of the first compressor is less than the first frequency, and the operating frequency of the second compressor is less than the second frequency.

4. The air conditioning system of claim 2, wherein the controller is further configured to increase the target supply temperature when the operating frequency of the first compressor is less than the first frequency, and the operating frequency of the second compressor is greater than the second frequency.

5. The air conditioning system of claim 2, wherein the controller is further configured to decrease the target supply temperature when the operating frequency of the first compressor is greater than the first frequency, and the operating frequency of the second compressor is less than the second frequency.

6. The air conditioning system of claim 2, wherein the controller is further configured to increase an amount of variation of the target supply temperature as a difference between the operating frequency of the first compressor and the first frequency becomes larger.

7. The air conditioning system of claim 2, wherein the controller is further configured to increase an amount of variation of the target supply temperature as a difference between the operating frequency of the second compressor and the second frequency becomes larger.

8. The air conditioning system of claim 2, wherein
the controller is further configured to change the target supply temperature when
a first frequency range being a range of frequencies including the first frequency is preset, and
the operating frequency of the first compressor is not within the first frequency range.

9. The air conditioning system of claim 2, wherein
the controller is further configured to change the target supply temperature when
a second frequency range being a range of frequencies including the second frequency is preset, and
the operating frequency of the second compressor is not within the second frequency range.

10. The air conditioning system of claim 2, wherein
the controller is further configured to, when a preset time elapses after the controller changes the target supply temperature, change the target supply temperature again, based on
a magnitude relationship between the operating frequency of the first compressor and the first frequency, and
a magnitude relationship between the operating frequency of the second compressor and the second frequency.

11. The air conditioning system of claim 1, further comprising a plurality of first refrigerant subsystems each including the first refrigerant circuit and the indoor unit, wherein
the controller is further configured to set, as the operating frequency of the first compressor, an average value of the operating frequency of the first compressor in each of the plurality of first refrigerant subsystems.

12. The air conditioning system of claim 1, further comprising a plurality of second refrigerant subsystems each including the second refrigerant circuit and the ventilating device, wherein
the controller is further configured to set, as the operating frequency of the second compressor, an average value of the operating frequency of the second compressor in each of the plurality of second refrigerant subsystems.

13. The air conditioning system of claim 1, further comprising:
a plurality of first refrigerant subsystems each including the first refrigerant circuit and the indoor unit; and
a plurality of second refrigerant subsystems each including the second refrigerant circuit and the ventilating device, wherein
the controller is further configured to
set, as the operating frequency of the first compressor, an average value of the operating frequency of the first compressor in each of the plurality of first refrigerant subsystems, and
set, as the operating frequency of the second compressor, an average value of the operating frequency of the second compressor in each of the plurality of second refrigerant subsystems.

14. An air conditioning system, comprising:
a first refrigerant circuit in which a first compressor and an indoor heat exchanger are included, and through which refrigerant circulates;
an indoor unit configured to cause indoor air in an indoor space to pass through the indoor heat exchanger, and provide the indoor air to the indoor space;
a second refrigerant circuit in which a second compressor and a heat exchanger for ventilation are included, and through which refrigerant circulates;
a ventilating device configured to introduce outdoor air from an outdoor space, cause the outdoor air to pass through the heat exchanger for ventilation, and provide supply air to the indoor space; and
a controller configured to
control an evaporating temperature of the first refrigerant circuit so that a temperature of the indoor air becomes a target indoor temperature,
control an evaporating temperature of the second refrigerant circuit so that a temperature of the supply air becomes a target supply temperature, and
change a set value of the target supply temperature based on the evaporating temperature of the first refrigerant circuit and the evaporating temperature of the second refrigerant circuit.

15. The air conditioning system of claim 14, wherein the controller is further configured to change the target supply temperature based on a magnitude relationship between the evaporating temperature of the first refrigerant circuit and the evaporating temperature of the second refrigerant circuit.

16. The air conditioning system of claim 14, wherein
the indoor heat exchanger has a greater amount of heat exchange than the heat exchanger for ventilation, and
the controller is further configured to decrease the target supply temperature when
the indoor heat exchanger and the heat exchanger for ventilation act as evaporators, and
the evaporating temperature of the first refrigerant circuit is less than the evaporating temperature of the second refrigerant circuit.

17. The air conditioning system of claim 14, wherein
the heat exchanger for ventilation has a greater amount of heat exchange than the indoor heat exchanger, and
the controller is further configured to increase the target supply temperature when
the indoor heat exchanger and the heat exchanger for ventilation act as evaporators, and
the evaporating temperature of the second refrigerant circuit is less than the evaporating temperature of the first refrigerant circuit.

18. The air conditioning system of claim 14, wherein the controller is further configured to increase an amount of variation of the target supply temperature as a difference between the evaporating temperature of the first refrigerant circuit and the evaporating temperature of the second refrigerant circuit becomes larger.

19. The air conditioning system of claim 14, wherein the controller is further configured to change the target supply temperature when a difference between the evaporating temperature of the first refrigerant circuit and the evaporating temperature of the second refrigerant circuit is equal to or greater than a preset temperature difference.

20. The air conditioning system of claim 14, wherein the controller is further configured to, when a preset time elapses after the controller changes the target supply temperature, change the target supply temperature again, based on a magnitude relationship between the evaporating temperature of the first refrigerant circuit and the evaporating temperature of the second refrigerant circuit.

21. The air conditioning system of claim 14, further comprising a plurality of first refrigerant subsystems each including the first refrigerant circuit and the indoor unit, wherein the controller is further configured to set, as the evaporating temperature of the first refrigerant circuit, an average value of the evaporating temperature of the first refrigerant circuit in each of the plurality of first refrigerant subsystems.

22. The air conditioning system of claim 14, further comprising a plurality of second refrigerant subsystems each including the second refrigerant circuit and the ventilating device, wherein the controller is further configured to set, as the evaporating temperature of the second refrigerant circuit, an average value of the evaporating temperature of the second refrigerant circuit in each of the plurality of second refrigerant subsystems.

23. The air conditioning system of claim 14, further comprising:

a plurality of first refrigerant subsystems each including the first refrigerant circuit and the indoor unit; and a plurality of second refrigerant subsystems each including the second refrigerant circuit and the ventilating device, wherein the controller is further configured to set, as the evaporating temperature of the first refrigerant circuit, an average value of the evaporating temperature of the first refrigerant circuit in each of the plurality of first refrigerant subsystems, and set, as the evaporating temperature of the second refrigerant circuit, an average value of the evaporating temperature of the second refrigerant circuit in each of the plurality of second refrigerant subsystems.

* * * * *